US009638137B2

(12) United States Patent
Doering

(10) Patent No.: US 9,638,137 B2
(45) Date of Patent: May 2, 2017

(54) METHOD AND DEVICE FOR DESULPHURIZING AN EXHAUST-GAS RECIRCULATION FLOW

(71) Applicant: MAN Truck & Bus AG, Munich (DE)

(72) Inventor: Andreas Doering, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 198 days.

(21) Appl. No.: 14/283,656

(22) Filed: May 21, 2014

(65) Prior Publication Data

US 2014/0360186 A1 Dec. 11, 2014

(30) Foreign Application Priority Data

Jun. 7, 2013 (DE) .................... 10 2013 009 578

(51) Int. Cl.
*F02M 25/07* (2006.01)
*F01N 3/20* (2006.01)
*F02M 26/50* (2016.01)
*F02M 26/15* (2016.01)
(Continued)

(52) U.S. Cl.
CPC ....... *F02M 25/0701* (2013.01); *F01N 3/2066* (2013.01); *F02M 26/15* (2016.02);
(Continued)

(58) Field of Classification Search
CPC .............. F01N 3/2066; F01N 2610/02; F02M 25/0701; F02M 26/07; F02M 26/05;
(Continued)

(56) References Cited

U.S. PATENT DOCUMENTS 6,009,709 A * 1/2000 Bailey ..................... F01N 3/02
123/568.12
6,182,443 B1 * 2/2001 Jarvis ................ B01D 53/9477
60/274
(Continued)

FOREIGN PATENT DOCUMENTS

DE 3603365 A1 8/1986
DE 3636554 A1 5/1988
(Continued)

OTHER PUBLICATIONS

Machine Translation to FR 2961254 A3 (Ferrendier), (Dec. 2011).*

*Primary Examiner* — Mark Laurenzi
*Assistant Examiner* — Brandon Lee
(74) *Attorney, Agent, or Firm* — Lucas & Mercanti, LLP

(57) ABSTRACT

A method for desulphurizing an exhaust-gas recirculation flow of an internal combustion engine supplied to the internal combustion engine on the fresh-air side includes branching a partial exhaust-gas flow from the exhaust-gas flow of the internal combustion engine. At least one reactant is supplied to the partial exhaust-gas flow that splits to form ammonia, and the thus laden partial exhaust-gas flow is supplied partially, as an exhaust-gas recirculation flow, to the fresh-air side and partially, as an aftertreatment partial flow, to an exhaust-gas aftertreatment system. The flow rate of the exhaust-gas recirculation flow supplied to the fresh-air side and the flow rate of the aftertreatment partial flow supplied to the exhaust gas aftertreatment system are predefined and/or varied by a regulating device as a function of at least one operating parameter that defines the respective operating state of the internal combustion engine.

19 Claims, 2 Drawing Sheets

(51) Int. Cl.
*F02B 37/18* (2006.01)
*F02B 29/04* (2006.01)
*F02M 26/07* (2016.01)
*F02M 26/05* (2016.01)
*F02M 26/06* (2016.01)
*F02M 26/23* (2016.01)

(52) U.S. Cl.
CPC ......... *F02M 26/50* (2016.02); *F01N 2610/02* (2013.01); *F02B 29/0406* (2013.01); *F02B 37/18* (2013.01); *F02M 26/05* (2016.02); *F02M 26/06* (2016.02); *F02M 26/07* (2016.02); *F02M 26/23* (2016.02); *Y02T 10/24* (2013.01)

(58) Field of Classification Search
CPC ........ F02M 26/06; F02M 26/50; F02M 26/15; F02M 26/23; F02B 29/0406; F02B 37/18; Y02T 10/121; Y02T 10/24
See application file for complete search history.

(56) References Cited

U.S. PATENT DOCUMENTS

| | | | | |
|---|---|---|---|---|
| 7,490,462 | B2* | 2/2009 | Roozenboom | F02M 26/42 123/562 |
| 9,347,366 | B2* | 5/2016 | Fukuyama | F02B 25/04 |
| 2005/0224060 | A1* | 10/2005 | Hill | F02B 9/06 123/568.21 |
| 2012/0240557 | A1* | 9/2012 | Kawaguchi | F01N 3/2013 60/278 |

FOREIGN PATENT DOCUMENTS

| | | | |
|---|---|---|---|
| DE | 4038054 A1 | 6/1992 | |
| DE | 10357402 A1 | 7/2005 | |
| EP | 1052009 A1 | 11/2000 | |
| FR | 2961254 A3 * | 12/2011 | ......... F02M 25/0709 |
| JP | 2009085011 A | 4/2009 | |
| WO | 2012096123 A1 | 7/2012 | |

* cited by examiner

METHOD AND DEVICE FOR DESULPHURIZING AN EXHAUST-GAS RECIRCULATION FLOW

CROSS-REFERENCE TO RELATED APPLICATIONS

This application claims the priority of DE 10 2013 009 578.6 filed Jun. 7, 2013, which is incorporated by reference herein.

BACKGROUND OF THE INVENTION

The invention relates to a method for desulphurizing an exhaust-gas recirculation flow in the case of an internal combustion engine and to a device for carrying out the method.

Exhaust-gas recirculation is used in internal combustion engines in order to lower NOx emissions, wherein there is the problem that, if fuel containing high levels of sulphur is used, sulphur dioxide and, within the cooled exhaust-gas recirculation arrangement, sulphuric acids and/or sulphurous acids are generated which lead to severe corrosion of the engine components such as charge-air pipe, inlet valves, cylinder liners etc.

In technical terms, exhaust gases are normally desulphurized through the addition of CaOH or CaO and the subsequent formation of calcium sulphate (DE000003603365C2). However, the use thereof in the EGR line is difficult because CaO, CaOH and the CaSO4 that forms are relatively highly abrasive, which leads to severe wear of the cylinder liners.

Desulphurization is also possible by means of $NH_3$ with the formation of ammonium sulphate (DE 3636554 A1), but this has failed to become established owing to the high costs for the $NH_3$ that is used and the cumbersome process management:

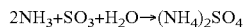
$$2NH_3+SO_3+H_2O \rightarrow (NH_4)_2SO_4$$

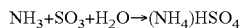
$$NH_3+SO_3+H_2O \rightarrow (NH_4)HSO_4$$

Thus, if this method is used, the exhaust gas temperature must be lowered to values below 300° C., advantageously to values below 100° C., because above said values, ammonium sulphate or ammonium hydrogen sulphate respectively breaks down again or does not form at all.

On the other hand, by means of selective catalytic reduction (referred to as the SCR method for short), it is possible for nitrogen oxides to be catalytically reduced downstream of the internal combustion engine with the aid of $NH_3$. Usually, in vehicles, instead of $NH_3$, use is made of urea which releases $NH_3$ in the hot exhaust gas. This breakdown can be improved through the use of a so-called hydrolysis catalytic converter such as is described for example in DE 4038054.

EP1052009 furthermore discloses a method for carrying out the breakdown of urea in a partial flow.

It is basically possible, in an exhaust-gas recirculation system, to enrich the exhaust-gas recirculation flow with $NH_3$ in order to lower the nitrogen oxide emissions in a so-called selective non-catalytic reduction (SNCR), as per the following equation:

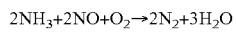
$$2NH_3+2NO+O_2 \rightarrow 2N_2+3H_2O$$

Owing to the poor selectivity of this reaction, it is only possible to attain NOx conversion levels of 15 to 25%, by contrast to the catalytic SCR method, in which conversion levels of over 95% are attained.

DE 103 57 402 A1 discloses a method for the operation of an internal combustion engine which has an exhaust-gas purification system with an ammonia-generating catalytic converter. Ammonia is generated, by means of the ammonia-generating catalytic converter, from the exhaust-gas flow conducted from the internal combustion engine to a turbine of an exhaust-gas turbocharger. A partial exhaust-gas flow is branched off from the ammonia-enriched exhaust-gas flow upstream of the turbine of the exhaust-gas turbocharger, said partial exhaust-gas flow being fed in on the fresh-air side of the internal combustion engine as an exhaust-gas recirculation flow. The exhaust-gas recirculation flow can be influenced by means of throttle valves that are provided, but no provision is made for a targeted supply of ammonia into the exhaust-gas recirculation flow, and there is thus also no provision made for an adaptation of the $NH_3$ flow rate required for optimum desulphurization of the recirculated exhaust-gas flow. This has the effect that the $NH_3$ concentration in the exhaust-gas recirculation arrangement corresponds to the $NH_3$ concentration upstream of the SCR catalytic converter. Furthermore, in the case of fuels with high sulphur content, there is a further problem: before the exhaust-gas flow can be supplied to the fresh air, said exhaust-gas flow must be cooled because there would otherwise be the possibility of increased NOx emissions, reduced power and, in the worst case, damage to the engine. However, at the coolers required for this purpose, if temperatures of approximately 300° C. are undershot and ammonia is present, ammonium sulphate and/or ammonium hydrogen sulphate are precipitated, which lead to blockage of the cooler.

WO 2012/096123 A1 discloses an internal combustion engine which is operated with $NH_3$ and in which an exhaust-gas recirculation flow to the fresh-air side of the compressor of the turbocharger is branched off from the exhaust-gas flow downstream of the turbine of a turbocharger. Here, an aqueous ammonia solution is injected into the exhaust-gas recirculation flow. This serves two purposes: firstly, this causes the recirculated exhaust-gas flow to be cooled, and secondly, the ammonia reacts in the combustion chamber, with the nitrogen oxides generated there, to form nitrogen in the "selective non-catalytic reduction" (SNCR) already described above. As a result of the combination of the two functions, specifically the cooling of the exhaust gas and the reduction of the nitrogen oxides by means of $NH_3$, the partially different demands cannot be varied independently of one another, and it is certainly not possible to realize an additional, independent function such as the desulphurization through ammonium salt formation.

Both methods have in common the fact that they do not work with ammonia precursor substances such as urea, guanidinium formate, cyanuric acid or ammonium formate. The reason for this lies in the high corrosivity of the compounds and/or of the products formed therefrom, such as isocyanic acid and formic acid.

Furthermore, JP 2009-85011 A discloses a method in which, as a function of a pH value measured at the inlet side, $NH_3$ is if required generated and supplied to the fresh-air side in order to influence the pH value.

BRIEF SUMMARY OF THE INVENTION

The invention is based on the object of specifying a method for exhaust-gas aftertreatment for an internal combustion engine, by means of which method targeted desulphurization is possible at the lowest possible cost.

According to an embodiment of the present invention, a partial exhaust-gas flow which is branched off from the exhaust-gas flow of the internal combustion engine has supplied thereto at least one reactant that splits to form ammonia, and the thus laden partial exhaust-gas flow is supplied partially, as an exhaust-gas recirculation flow, to the fresh-air side and partially, as an aftertreatment partial flow, to an exhaust-gas aftertreatment system, wherein the flow rate of the exhaust-gas recirculation flow supplied to the fresh-air side and the flow rate of the aftertreatment partial flow supplied to the exhaust gas aftertreatment system are predefined and/or varied as a function of at least one operating parameter that defines the respective operating situation of the internal combustion engine. Through the supply of ammonia into the branched-off partial exhaust-gas flow, it is possible to realize desulphurization of the exhaust-gas recirculation flow with a relatively small supply of ammonia, and thus correspondingly at low cost. As already described above, this is realized through the formation of ammonium sulphate:

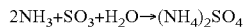

$$2NH_3 + SO_3 + H_2O \rightarrow (NH_4)_2SO_4$$

Contrary to the prior art, the flow rate of the $NH_3$ supplied to the exhaust-gas recirculation arrangement or fresh-air side can, by variation of the flow rate of the $NH_3$-laden partial exhaust-gas flow supplied to the exhaust-gas recirculation arrangement or fresh-air side and variation of the flow rate of the $NH_3$-laden partial exhaust-gas flow supplied to the exhaust-gas aftertreatment system, be adapted to the amount required for the desulphurization. Since the concentration of sulphur oxides in the exhaust gas is normally lower than the concentration of the nitrogen oxides, this means that the $NH_3$ concentration upstream of the inlet into the combustion chamber is set to be lower than the NOx concentration but greater than or equal to the SOx concentration.

A further advantage or the method in relation to the prior art consists in that it is possible to use not only ammonia but also the precursor substances thereof such as urea, guanidinium formate (GUFO), cyanuric acid or ammonium formate, because a release of $NH_3$ is promoted owing to the high temperature level prevailing upstream of the turbocharger. This may additionally be improved through the use of catalytic converters downstream of the supply point for the reactants that split to form ammonia. In the case of urea, cyanuric acid and ammonium formate, use is expediently made of catalytic converters containing titanium oxide and/or silicon oxide and/or iron oxide and/or tungsten oxide and/or aluminium oxide and/or vanadium oxide and/or zeolites, and in the case of GUFO, use is expediently made of catalytic converters containing gold.

The partial exhaust-gas flow may basically be branched off downstream of a turbine of an exhaust-gas turbocharger. An embodiment is however particularly preferable in which, in the case of an internal combustion engine that is supercharged by means of an exhaust-gas turbocharger, the partial exhaust-gas flow is branched off upstream of a turbine of the exhaust-gas turbocharger. This extraction at the high-pressure side of the turbocharger makes it possible to realize a simple overall construction because, owing to the pressure difference, it is generally possible to dispense with delivery devices for the $NH_3$-laden exhaust-gas flow.

The ammonia-laden partial flow is expediently supplied to the exhaust-gas recirculation flow or to the fresh air downstream of the exhaust-gas cooler or, in the case of supercharged internal combustion engines, downstream of a charge-air cooler. In this way, by contrast to the prior art, blockage of the cooler by ammonium sulphate can be prevented.

The first partial exhaust-gas flow is preferably divided into an exhaust-gas recirculation flow and a second partial exhaust-gas flow that is used for the catalytic reduction, wherein the second partial exhaust-gas flow is fed into the exhaust-gas flow that is conducted to an SCR catalytic converter. In this way, the ammonia that is supplied to the branched-off first partial exhaust-gas flow can also be partially used for the selective catalytic reduction in an SCR catalytic converter.

The exhaust-gas recirculation system may also be operated such that a further partial exhaust-gas flow that is branched of downstream of an SCR catalytic converter is fed in on the fresh-air side of the internal combustion engine. By means of throttling of the various branched-off partial exhaust-gas flows, it is possible to realize targeted exhaust-gas recirculation with which desulphurization of the exhaust-gas recirculation flow is ensured.

The ammonia-laden partial flow is preferably supplied into the fresh-air side or exhaust-gas recirculation arrangement downstream of one or more coolers at the fresh-air side or exhaust-gas recirculation side. If said separate cooler is dispensed with and is functionally combined with the charge-air cooler, that is to say the charge air and recirculated exhaust gas are merged upstream of the charge-air cooler, the supply of the ammonia-laden partial flow takes place, in turn, downstream of said cooler.

A third partial exhaust-gas flow that is branched off upstream of the turbine of the exhaust-gas turbocharger may be fed in to the fresh-air side of the internal combustion engine. Said third partial exhaust-gas flow is preferably cooled to a suitable exhaust-gas temperature by means of a heat exchanger.

Throttling of the partial exhaust-gas flows and/or of a second partial exhaust-gas flow that is supplied to an SCR catalytic converter is preferably performed as a function of operating parameters of the overall system. This yields optimum operating conditions both for the demanded desulphurization and also for a selective catalytic reduction that is to be performed. It is particularly advantageous here if the flow rate of $NH_3$ supplied is also regulated as a function of operating parameters of the overall system.

The invention is also based on the object of providing a device for desulphurizing an exhaust-gas recirculation flow in the case of an internal combustion engine, which device can be used in particular for carrying out the method according to the invention.

According to another embodiment of the present invention, it is provided that a first branch line branches off from the exhaust line that leads from the internal combustion engine to an exhaust-gas aftertreatment system, which first branch line recirculates a first partial exhaust-gas flow, as ammonia-laden exhaust-gas recirculation flow, to the fresh-air side or exhaust-gas recirculation arrangement of the internal combustion engine, wherein the first branch line is coupled to a supply device for the supply of at least one reactant that splits to form ammonia. Furthermore, a second branch line is provided which branches off from the first branch line and which recirculates a part of the first partial exhaust-gas flow into the exhaust-gas aftertreatment system for exhaust-gas aftertreatment, wherein a control and/or regulating device is provided which predefines and/or varies the flow rate of the exhaust-gas recirculation flow supplied to the fresh-air side, and the flow rate of the aftertreatment partial flow supplied to the exhaust-gas aftertreatment system, as a function of at least one operating parameter that defines the respective operating situation of the internal combustion engine. It is thus preferably possible here for the breakdown of reducing agent to take place in parallel with respect to an exhaust-gas turbocharger, where there is a high ammonia concentration. The high pressure level prevailing here has the effect that additional delivery devices are generally not required.

It is also advantageous for a third branch line to branch off from the exhaust line that leads to the turbine, which third branch line is connected to a fresh-air line of the internal combustion engine via a heat exchanger. It is thus possible for an additional exhaust-gas recirculation flow, the temperature of which has been reduced, to be fed in on the fresh-air side of the internal combustion engine. Here, the high-pressure side of a compressor of the turbocharger and the first branch line may be connected to the fresh-air line.

To be able to realize optimum regulation of the gas flows in a manner dependent on operating parameters, it is preferable for controllable throttle devices to be arranged in the first branch line upstream and downstream of the second branch line that branches off from the first branch line.

Here, the expression "fresh-air side" is expressly to be understood in a broad sense, and is self-evidently intended to encompass not only the supply of the exhaust-gas recirculation flow to a fresh-air flow but also the possibility of a supply to one or more medium flows flowing to or back to the fresh-air side, in particular expressly also a supply to an exhaust-gas recirculation flow of an exhaust-gas recirculation device.

BRIEF DESCRIPTION OF THE DRAWINGS

The invention will be explained in more detail below on the basis of exemplary embodiments that are illustrated in the drawings, in which.

DETAILED DESCRIPTION OF THE PREFERRED EMBODIMENTS

Figure 1:
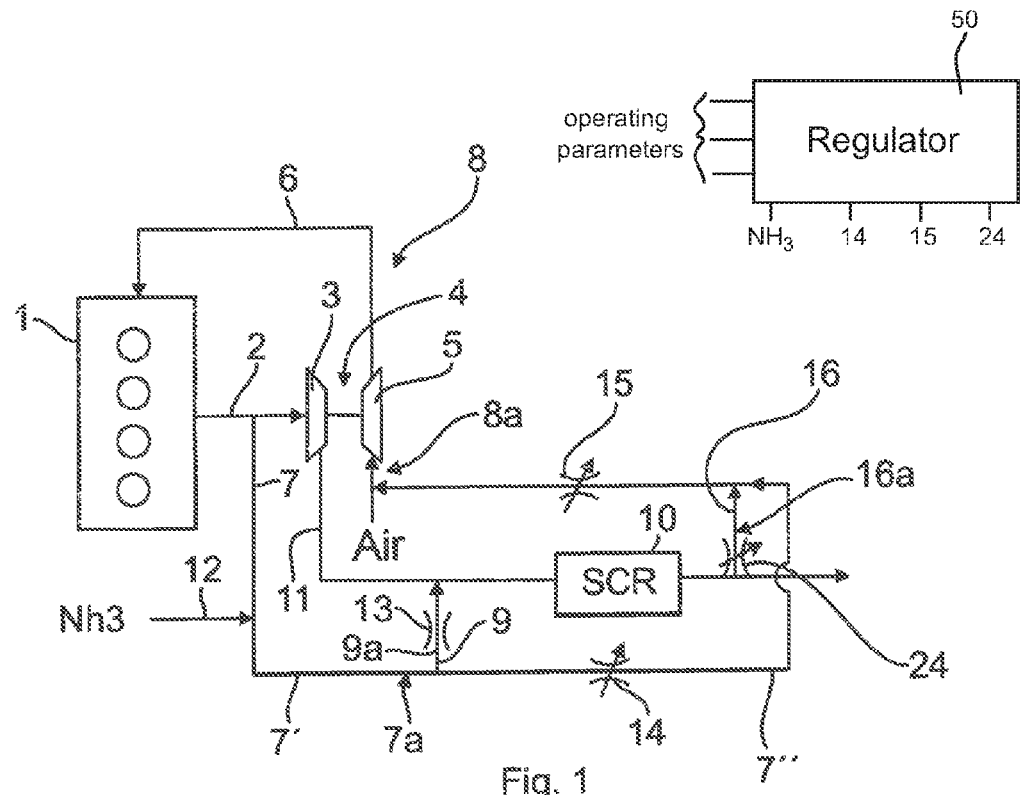
FIG. 1 shows an internal combustion engine having an exhaust-gas recirculation system, in which the supply of an $NH_3$-laden exhaust-gas flow takes place on a suction side of a compressor.

The schematic illustration of FIG. 1 shows an internal combustion engine 1, the exhaust-gas flow of which is supplied via an exhaust-gas line 2 to a turbine 3 of a turbocharger 4, The turbine 3 drives a compressor 5 of the turbocharger 4, by means of which compressor air is supplied to the internal combustion engine 1 via a fresh-air line 6.

A first partial exhaust-gas flow 7 is branched off from the exhaust line 2 via a first branch line 7a, which first partial exhaust-gas flow is partially, as an ammonia-laden exhaust-gas recirculation flow 7" in a manner yet to be described, admixed to the drawn-in air on a suction side 8a of the compressor 5. A second branch line 9a branches off from the first branch line 7a, via which second branch line a second partial exhaust-gas flow 9 is fed into an exhaust line 11 that leads to an SCR catalytic converter 10, The main exhaust-gas flow of the internal combustion engine 1 is supplied to the SCR catalytic converter 10 via the exhaust line 11.

Via an injection line 12, a flow rate of $NH_3$ suitable for the desulphurization of the exhaust-gas recirculation flow 7" is supplied to the first partial exhaust-gas flow 7. Furthermore, the branched-off partial flows are controlled and/or regulated as a function of operating parameters of the overall system by means of throttle devices 13 to 15. In the exemplary embodiment illustrated, for this purpose, the throttle devices 14 and 15 are in the form of throttle devices that can be regulated and/or controlled by means of a control and/or regulating device 50. The supplied $NH_3$ flow rate and the throttling of the partial flows in the various branch lines may be controlled as a function of the sulphur content of the fuel, the air/fuel ratio, and also the exhaust-gas flow rate recirculated to the fresh-air side 8 of the internal combustion engine 1. Further parameters of the overall system may also be incorporated into the control in order to realize optimum desulphurization of the exhaust-gas recirculation flow recirculated to the internal combustion engine 1, as will be explained and presented in detail below.

FIG. 1 also shows a further branch line 16a via which an additional recirculation of a partial exhaust-gas flow to the fresh-air side 8 of the internal combustion engine 1 takes place downstream of the SCR catalytic converter 10, specifically preferably in a manner controlled and/or throttled by means of a throttle device 24 that is coupled to the control and/or regulating device 50.

Figure 3:
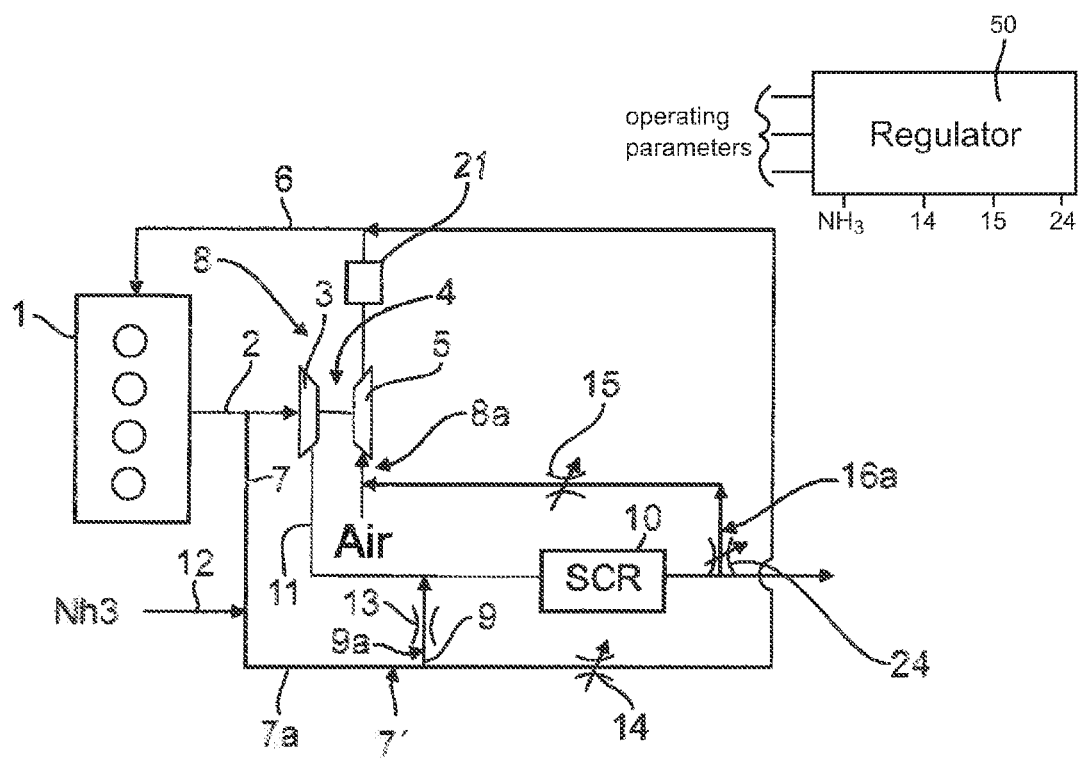
FIG. 3 shows an internal combustion engine having an exhaust-gas recirculation system in which the supply of an $NH_3$-laden exhaust-gas flow takes place on a pressure side of a compressor.

FIG. 3 shows a construction similar to FIG. 1. By contrast to FIG. 1, however, it is provided in this case that the ammonia-laden partial flow 7' is first supplied to the fresh-air side 8 downstream of a charge-air cooler 21 which is connected into the fresh-air line 6 downstream of the compressor 5. The intention of this is to prevent blockage of the charge-air cooler 21 by ammonium sulphate.

Figure 2:
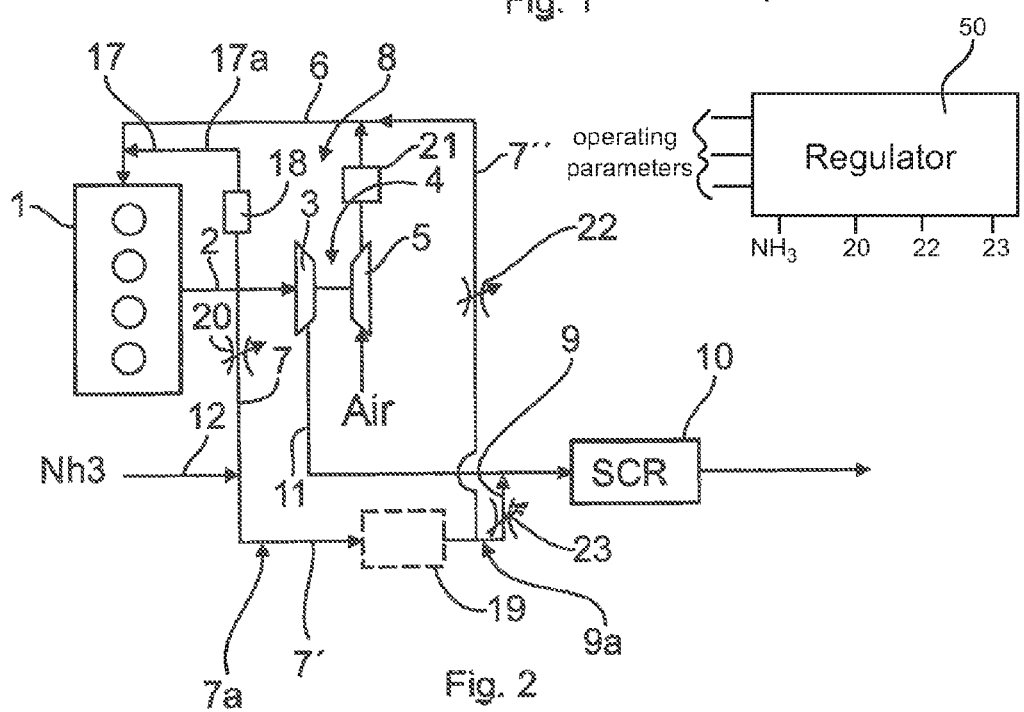
FIG. 2 shows an internal combustion engine having an exhaust-gas recirculation system in which an $NH_3$-laden exhaust-gas flow is supplied on a fresh-air side downstream of a compressor of the internal combustion engine.

In the exemplary embodiment illustrated in FIG. 2, the internal combustion engine 1 is connected to an exhaust line 2 which drives the turbine 3 of a turbocharger 4. A compressor 5 of the turbocharger 4 draws in air and delivers said air to the fresh-air side of the internal combustion engine 1 via the fresh-air line 6.

From the exhaust line 2 there branches off a third branch line 17a via which a third partial exhaust-gas flow 17 is, at the fresh-air side, fed into the fresh-air line 6, By means of a heat exchanger 18, said third partial exhaust-gas flow 17 is cooled to a suitable process temperature. The merging of the ammonia-laden exhaust-gas recirculation flow 7" with the exhaust-gas recirculation arrangement or fresh-air line 6 takes place downstream of the heat exchanger 18 in order to prevent blockage of the cooler or heat exchanger 18 by ammonium sulphates.

A first partial exhaust-gas flow 7 that is branched off from the exhaust line 2 via a first branch line 7a passes via the latter to the fresh-air side 8 of the internal combustion engine 1, The remainder of the first partial exhaust-gas flow 7 passes, as ammonia-laden partial exhaust-gas flow 7', via a second branch line 9 into an exhaust-gas aftertreatment system which, in this case, by way of example, comprises an SCR catalytic converter 10. A catalytic converter 19 for breaking down the reactant that splits to form ammonia may also be incorporated into the first branch line 7a in order to promote the release of $NH_3$ and prevent the formation of undesired corrosive reaction products.

To regulate the fraction of $NH_3$ contained in the recirculated exhaust gas, the supply of $NH_3$ may be regulated and/or controlled by means of the control and/or regulating device already mentioned above or by means of a separate control and/or regulating device.

Furthermore, it is preferable for controllable and/or regulable throttle devices 20, 22 and 23 to be provided in order to control and/or regulate the flow throughput in the various gas lines. This makes it possible for the individual components of the overall system composed of exhaust-gas recirculation arrangement, desulphurization arrangement and SCR catalytic converter to be operated, or regulated or controlled, independently of one another. The following basically applies here:

The flow rate of $NH_3$ supplied to the exhaust-gas recirculation arrangement or to the fresh-air side and/or the flow rate of the partial flow supplied to the exhaust-gas recirculation arrangement or to the fresh-air side are/is dependent on the following factors, and are/is varied by means of the corresponding control elements:
sulphur content of the fuel,
air/fuel ratio,
charge pressure,
air humidity,
recirculated exhaust-gas flow rate (EGR rate),
whereas the exhaust-gas recirculation is dependent on the following:
a setpoint untreated NOx value,
a setpoint soot value,
the air/fuel ratio,
and the SCR reaction is influenced by the following variables:
untreated NOx emissions,
setpoint NOx concentration,
SCR catalytic converter temperature, This has the result, for example, that the flow rate of reactant supplied via the injector line 12 is defined by the sum of the $NH_3$ flow rate required for the desulphurization of the recirculated exhaust gas and the $NH_3$ flow rate required for the SCR reaction. The supplied $NH_3$ flow rate is in this case normally defined by at least four of the above-mentioned variables.

The division of this flow rate into the partial flow rates required for the SCR and desulphurization subsystems is subsequently performed by means of the throttle devices arranged in the partial flows, that is to say by means of the throttle devices 13, 14, 15, 20, 22, 23 and 24 in the exemplary embodiments illustrated.

The invention claimed is:

1. A method for desulphurizing an exhaust-gas recirculation flow of an internal combustion engine supercharged by an exhaust-gas turbocharger, said exhaust-gas recirculation flow being supplied to a fresh-air side of the internal combustion engine, and ammonia being used for the desulphurization, the method comprising the steps of:
branching off a first partial exhaust-gas flow from the exhaust-gas flow of the internal combustion engine so that the first partial exhaust gas flow flows through a first branch line connected to an exhaust gas line of the internal combustion engine upstream of a turbine of the exhaust-gas turbocharger;
supplying to the first partial exhaust-gas flow in the first branch line at least one reactant that splits to form ammonia to form a laden exhaust-gas flow in the first branch line;
branching the laden exhaust-gas flow into an exhaust-gas recirculation flow in the first branch line and an aftertreatment partial flow in a second branch line connected to the first branch line;
supplying the exhaust-gas recirculation flow to the fresh-air side of the internal combustion engine through the first branch line, the first branch line being connected directly to the fresh-air side;
supplying the aftertreatment partial flow to an exhaust-gas aftertreatment system via the second branch line, the aftertreatment partial flow bypassing the turbine of the exhaust-gas turbocharger; and
controlling, by a regulator, at least one throttle device to control flow rates of the exhaust-gas recirculation flow and the aftertreatment partial flow as a function of at least one operating parameter defining a respective operating state of the internal combustion engine.

2. The method of claim 1, wherein the aftertreatment partial flow is conducted to an SCR catalytic converter.

3. The method of claim 2, further comprising:
branching off a further exhaust-gas partial flow from the aftertreatment partial flow in a further branch line connected downstream of the SCR catalytic converter;
feeding the further exhaust-gas partial flow to the fresh-air side of the internal combustion engine via the further branch line; and
regulating, by the regulator, a further throttle device to control a flow rate of the further exhaust-gas partial flow as a function of at least one of a flow rate of the exhaust-gas recirculation flow supplied to the fresh-air side, a flow rate of the aftertreatment partial flow through the SCR catalytic converter, and at least one operating parameter that defines a respective operating state of the internal combustion engine.

4. The method of claim 1, further comprising:
branching off a further exhaust-gas partial flow in a third branch line connected to the exhaust gas line upstream of the turbine of the turbocharger;
feeding the further exhaust-gas partial flow to the fresh-air side of the internal combustion engine via the third branch line; and
regulating, by the regulator, a further throttle device to control a flow rate of the further exhaust-gas partial flow as a function of at least one of a flow rate of the exhaust-gas recirculation flow supplied to the fresh-air side, a flow rate of the aftertreatment partial flow supplied to an exhaust-gas aftertreatment system, and at least one operating parameter that defines a respective operating state of the internal combustion engine.

5. The method of claim 4, further comprising cooling the further exhaust-gas partial flow in a heat exchanger prior to said step of feeding the further exhaust-gas partial flow to the fresh-air side.

6. The method of claim 1, further comprising breaking down the at least one reactant in at least one catalytic converter through which the laden exhaust-gas flow is conducted.

7. The method of claim 6, wherein the catalytic converter comprises as active components at least one of the following compounds or elements, and oxide forms thereof:
titanium,
silicon,
vanadium,
tungsten,
iron,
aluminum,
gold, and
zeolites.

8. The method of claim 1, wherein the laden exhaust-gas flow is supplied to the fresh-air side upstream of a compressor of the turbocharger.

9. The method of claim 1, wherein the laden exhaust-gas flow is supplied to the fresh-air side downstream of a compressor of the turbocharger.

10. The method of claim 1, wherein the laden exhaust-gas flow is supplied to the fresh-air side downstream of coolers installed in the fresh-air side.

11. The method of claim 1, wherein a supplied ammonia flow rate is regulated as a function of at least four of the following operating parameters:
sulphur content of the fuel,
air/fuel ratio,
charge pressure,
air humidity,
recirculated exhaust-gas flow rate (EGR rate),
untreated NOx emissions,
setpoint NOx concentration, and
temperature of an SCR catalytic converter.

12. A device for desulphurizing an exhaust-gas recirculation flow supplied to a fresh-air side of an internal combustion engine having a turbocharger, the device comprising:
a first branch line that branches off from an exhaust line of the internal combustion engine upstream of a turbine of the turbocharger and that leads to an exhaust-gas aftertreatment system, the first branch line having a connection to the fresh-air side of the internal combustion engine;
a supply device coupled to the first branch line and supplying at least one reactant that splits to form ammonia, wherein the first branch line recirculates an ammonia laden exhaust-gas recirculation flow into the fresh-air side of the internal combustion engine;
a second branch line that branches off from the first branch line downstream from the supply device and upstream of the connection to the fresh-air side, the second branch recirculating a part of the laden exhaust-gas recirculation flow into the exhaust gas aftertreatment system, the second branch line bypassing the turbine of the turbocharger; and
a regulator regulating at least one throttle device to control a flow rate of the exhaust-gas recirculation flow supplied to the fresh air side via the first branch line and a flow rate of the aftertreatment partial flow supplied to the aftertreatment system via the second branch line as a function of at least one operating parameter that defines an operating state of the internal combustion engine.

13. The device of claim 12, further comprising a third branch line that branches off from the exhaust line and includes a heat exchanger, the third branch line further including a connection to a fresh-air line of the internal combustion engine downstream of the heat exchanger.

14. The device of claim 13, wherein a high-pressure side of a compressor of the turbocharger and the first branch line are connected to the fresh-air line.

15. The device of claim 12, further comprising a further branch line that branches off from the exhaust line downstream of the aftertreatment system and is supplied to the fresh-air side.

16. The device of claim 15, wherein the further branch line is supplied to the first branch line.

17. The device of claim 12, wherein the connection of the first branch line to the fresh-air side is upstream of a compressor of the turbocharger.

18. The device of claim 12, wherein the connection of the first branch line to the fresh-air side is downstream of a compressor of the turbocharger.

19. The device of claim 12, wherein the fresh-air side includes coolers, and the connection of the first branch line to the fresh-air side is downstream of the coolers installed in the fresh-air side.

* * * * *